(12) United States Patent
Kim

(10) Patent No.: US 12,703,071 B2
(45) Date of Patent: Aug. 11, 2026

(54) PULL STUD BOLT INSTALLATION AND REMOVAL TOOL AND TUBULAR BODY MANUFACTURING METHOD THEREOF

(71) Applicant: PROTOENG CO., LTD., Yangsan-si (KR)

(72) Inventor: Jun Yeop Kim, Busan (KR)

(73) Assignee: PROTOENG CO., LTD., Changwon-si (KR)

( * ) Notice: Subject to any disclaimer, the term of this patent is extended or adjusted under 35 U.S.C. 154(b) by 158 days.

(21) Appl. No.: 18/551,816

(22) PCT Filed: Jun. 13, 2023

(86) PCT No.: PCT/KR2023/008111
§ 371 (c)(1),
(2) Date: Sep. 21, 2023

(87) PCT Pub. No.: WO2024/106659
PCT Pub. Date: May 23, 2024

(65) Prior Publication Data

US 2025/0033174 A1 Jan. 30, 2025

(30) Foreign Application Priority Data

Nov. 17, 2022 (KR) ........................ 10-2022-0154833

(51) Int. Cl.
*B25B 27/14* (2006.01)
*B21K 1/46* (2006.01)
(Continued)

(52) U.S. Cl.
CPC ................ *B25B 27/14* (2013.01); *B21K 1/46* (2013.01); *B23H 1/02* (2013.01); *B25B 13/50* (2013.01)

(58) Field of Classification Search
CPC ....... B25B 27/14; B25B 13/50; B25B 13/065; B25B 13/5016; B25B 23/142; B21K 1/46;
(Continued)

(56) References Cited

U.S. PATENT DOCUMENTS 4,420,995 A 12/1983 Roberts
4,604,009 A 8/1986 Tennerstedt
(Continued)

FOREIGN PATENT DOCUMENTS

CN 204308802 U 5/2015
CN 103180087 1/2016
(Continued)

OTHER PUBLICATIONS

PCT/KR2023/008111 . "International Search Report and Written Opinion", mailed on Sep. 19, 2023 , 9 pages.
(Continued)

*Primary Examiner* — Lee A Holly
(74) *Attorney, Agent, or Firm* — Kilpatrick Townsend & Stockton LLP

(57) ABSTRACT

The present disclosure relates to a pull stud bolt installation and removal tool for installing or removing a pull stud bolt (also referred to as a retention knob) onto or from a tool holder used in a machine tool, such as a machining center. The pull stud bolt installation and removal tool is a common product that is capable of properly restraining pull stud bolts of various types and specifications and is coupled with a torque wrench to accurately and safely tighten pull stud bolts to tool holders and jigs at desired locations with a specified torque.

7 Claims, 16 Drawing Sheets

(51) Int. Cl.
*B23H 1/02* (2006.01)
*B25B 13/50* (2006.01)

(58) Field of Classification Search
CPC . B23H 1/02; B23B 2231/0296; B23B 31/006; B23B 2260/078
See application file for complete search history.

(56) References Cited

U.S. PATENT DOCUMENTS

| | | | |
|---|---|---|---|
| 4,632,613 | A | 12/1986 | Wollermann |
| 4,729,702 | A | 3/1988 | Kelm |
| 4,777,715 | A | 10/1988 | Roberts |
| 4,850,766 | A | 7/1989 | Furuhashi et al. |
| 4,906,147 | A | 3/1990 | Friesinger et al. |
| 4,909,684 | A | 3/1990 | Kelm et al. |
| 4,930,956 | A | 6/1990 | Mantovani |
| 4,938,108 | A | 7/1990 | Meckler |
| 4,948,309 | A | 8/1990 | Newland et al. |
| 4,958,980 | A | 9/1990 | Holmes et al. |
| 5,342,155 | A | 8/1994 | Harroun |
| 5,598,994 | A | 2/1997 | Olewinski et al. |
| 5,885,039 | A | 3/1999 | Boisvert |
| 6,047,621 | A | 4/2000 | Dries |
| 6,224,306 | B1 | 5/2001 | Hiroumi |
| 6,238,152 | B1 | 5/2001 | Fujimoto et al. |
| 6,360,634 | B1 | 3/2002 | Leitch |
| 6,695,321 | B2 | 2/2004 | Bedi et al. |
| 7,278,196 | B1 | 10/2007 | Stojanovski |
| 8,366,120 | B2 | 2/2013 | Hu |
| 9,463,514 | B2 | 10/2016 | Maiwald et al. |
| 10,226,825 | B2 | 3/2019 | Berg |
| 10,710,171 | B1 | 7/2020 | Chen |
| 11,219,987 | B2 * | 1/2022 | Anex ...................... B23B 31/06 |
| 2005/0158135 | A1 | 7/2005 | Massa et al. |
| 2006/0065096 | A1 | 3/2006 | Liu |
| 2006/0163824 | A1 | 7/2006 | Sasaki et al. |
| 2006/0252618 | A1 | 11/2006 | Imahata |
| 2007/0098510 | A1 | 5/2007 | Phillips et al. |
| 2008/0210649 | A1 | 9/2008 | Faust |
| 2009/0279973 | A1 | 11/2009 | Erickson |
| 2009/0283975 | A1 | 11/2009 | Kretzschmann et al. |
| 2010/0176561 | A1 | 7/2010 | Braun et al. |
| 2011/0299951 | A1 | 12/2011 | Cook |
| 2012/0073092 | A1 | 3/2012 | Hobel |
| 2012/0098214 | A1 | 4/2012 | Ronald et al. |
| 2014/0086462 | A1 | 3/2014 | Shan et al. |
| 2014/0150565 | A1 | 6/2014 | Stoneback |
| 2015/0183071 | A1 | 7/2015 | Stoneback |
| 2017/0225237 | A1 | 8/2017 | Mihailovic |
| 2018/0290215 | A1 | 10/2018 | Greif et al. |
| 2020/0354616 | A1 | 11/2020 | Bariteau et al. |
| 2021/0402492 | A1 | 12/2021 | Haimer |

FOREIGN PATENT DOCUMENTS

| | | | |
|---|---|---|---|
| CN | 204935438 | U | 1/2016 |
| CN | 205614596 | U | 10/2016 |
| CN | 206493242 | U | 9/2017 |
| CN | 207564387 | U | 7/2018 |
| CN | 212096129 | U | 12/2020 |
| CN | 113825594 | A | 12/2021 |
| GB | 2096045 | A | 10/1982 |
| JP | S58040272 | A | 3/1983 |
| JP | H07266156 | A | 10/1995 |
| JP | H11090708 | A | 4/1999 |
| JP | 2006198755 | A | 8/2006 |
| JP | 3146887 | U | 12/2008 |
| KR | 10-2012-0031457 | A | 4/2012 |
| KR | 2017-0049762 | A | 5/2017 |
| KR | 10-2174528 | B1 | 11/2020 |
| TW | 329466 | B | 4/1998 |
| TW | 366302 | B | 8/1999 |

OTHER PUBLICATIONS

Office Action and Search Report for Taiwanese Patent Application No. 112144170 issued Jun. 6, 2024, 5 pages.
European Application No. 23804883.9, “Extended European Search Report”, mailed Feb. 25, 2025, 9 pages.
Japanese Application No. 2024-506176, “Office Action”, mailed Mar. 28, 2025, 4 pages.
Korean Application No. 10-2023-0159708, “Office Action”, mailed Apr. 4, 2025, 10 pages.
Office Action for Chinese Patent Application No. 202380013076.5 mailed May 14, 2026, 12 pages (including English translation).

* cited by examiner (a)

PULL STUD BOLT INSTALLATION AND REMOVAL TOOL AND TUBULAR BODY MANUFACTURING METHOD THEREOF

TECHNICAL FIELD

The present disclosure relates to a pull stud bolt installation and removal tool for installing or removing a pull stud bolt (also referred to as a retention knob) onto or from a tool holder used in a machine tool such as a machining center, and a method of manufacturing a tubular body therefor.

BACKGROUND ART

In general, machine tools are widely used to perform machining operations on various parts by using various materials. Machine tools are machines capable of machining materials into desired shapes by using various cutting tools, such as drills, taps, reamers, or face cutters.

FIG. 1 is a diagram illustrating a state in which an end mill, which is a cutting tool, is mounted on a machining center, which is a type of machine tool. The machine tool is coupled with a standardized tool holder to perform machining. At this time, as illustrated in FIG. 2, a component necessary for coupling a main spindle of the machine tool to the tool holder is a pull stud bolt (also referred to as a retention knob). Tool holders and pull stud bolts are subdivided into various types according to various international standards for each country.

As illustrated in FIG. 2, the pull stud bolt is installed at the end of the tool holder. The pull stud bolt is pulled while a collet and a draw bar installed inside the main spindle retract the tapered rear inclined surface of the knob of the pull stud bolt (hereinafter referred to as the knob rear inclined surface). Due to this force, the inclined surface of the tool holder and the inner inclined surface of the main spindle are brought into close contact and tightly coupled with each other. In addition, when male threads of the pull stud bolt and female threads of the tool holder are assembled together, the male threads and the female threads have to be tightened with a specified torque. The reasons for this are as follows. First, when the male thread and the female thread are tightened below the specified torque, the pull stud bolt may spontaneously loosen due to the vibration and centrifugal force generated during machining, resulting in an accident in which the tool holder is released. Second, when the male threads and the female threads are tightened with more than the specified torque, the inclined (tapered) surface of the tool holder may shrink.

That is, as illustrated in FIG. 3, an inclined surface L2 contracted by excessive torque is formed, in contrast to a perfect inclined surface L1 with a specified torque. Accordingly, a contact rate is lowered because there cannot be close contact with the inner inclined surface of the main spindle. Due to the nature of a machine tool, the tool performs machining while rotating at a high speed. As the tool shakes, problems occur in perpendicularity and true position. In addition, defects occur in the height of the machined surface, machined dimensions, machined surface roughness, and the like, resulting in a major problem in machining. Furthermore, an accident may occur in which the tool holder is released from the main spindle.

General-purpose tools such as spanners are used to assemble the pull stud bolt with the tool holder. Because a spanner is not a tool made exclusively for tightening a pull stud bolt, an inner plane of the spanner and a bolt flat portion formed on a side surface of a circular flange of the pull stud bolt are unstable due to a narrow contact surface. As the spanner is easily released from the pull stud bolt, a safety accident that damages the bolt flat portion of the pull stud bolt or injures hands may occur.

In addition, when machining is performed by using a machine tool, a jig is used to restrain a material to be machined. A pull stud bolt is also used to fix the jig to a machining table of the machine tool. Furthermore, when manufacturing a pull stud bolt, two planes (bolt flat portions) insertable into a spanner are formed such that the spanner may be used to tighten the pull stud bolt. The two planes are formed symmetrically on the side surface of the circular flange of the pull stud bolt and are formed as a right-angle where the two planes meet the machining surface therebelow. When machining the end in this manner, the end is machined by applying non-precise general machining tolerances. Accordingly, a problem arises in that the thickness from the end to the circular flange bottom surface seated on the tool holder and the thickness from the polished surface seated on the tool holder to the circular flange top surface are not constant. Therefore, problems arise in that the distance from the bolt flat portion right-angle end of the pull stud bolt, the circular flange bottom surface, the circular flange top surface to the knob lower inclined surface and the length of a knob lower connecting rod also have different dimensions for each product even within the same standard, and dimensions are different even depending on the manufacturer. Consequently, there is a problem in that there is no tool capable of perfectly restraining pull stud bolts having various standards and different dimensions for each product.

On the other hand, a technology related to a tool that is coupled with a torque wrench, which is a tool for installing or removing a pull stud bolt onto or from a tool holder, and transfers rotational force of the torque wrench to a pull stud bolt when the pull stud bolt is inserted thereinto is disclosed in U.S. patent Ser. No. 11/219,987, entitled "Tool for installation and removal of retention knobs," and U.S. Pat. No. 6,360,634, entitled "Pull stud removal device."

However, the tools manufactured in the prior art may not fundamentally fix the pull stud bolt completely. The tool disclosed in U.S. Pat. No. 11,219,987 includes a tubular body, a locking ball, a tubular sleeve, and a tubular end stop. A bolt flat portion right-angle end is seated on the top surface of the tubular body, and four locking balls come into contact with the knob rear inclined surface of the pull stud bolt. In this manner, a configuration that restrains the pull stud bolt is provided. However, as described above, the distance from the bolt flat portion right-angle end, the circular flange bottom surface, and the circular flange top surface to the knob rear inclined surface and the length of the knob lower connecting rod are different for each product. The phase of the locking ball in contact with the knob rear inclined surface is lowered or raised from the central axis of the tubular body, depending on the different distances. The raised locking ball collides with the edge of a 'thicker' portion 52 located on the inner circumferential surface of the tubular sleeve. Accordingly, the inner diameter surface of the 'thicker' portion 52 of the tubular sleeve may not be located on the circumference of the locking ball. That is, the tubular sleeve may not be located at a locking position, resulting in a fundamental problem in that the pull stud bolt is not restrained.

In addition, a method is disclosed in which the inner surface of the tubular sleeve and the outer surface of the tubular end stop are rubbed in order to maintain the locking position. Due to wear caused by continued friction between the inner surface and the outer surface, the friction portion becomes loose after several uses. Accordingly, a problem also arises in that the pull stud bolt spontaneously releases during use.

On the other hand, the pull stud bolt is manufactured by dividing the angle of the knob rear inclined surface into the standard of 45°, 60°, 75°, and 90° again within the same standard. In the case of using the tool disclosed in U.S. Pat. No. 11,219,987, a dedicated tool has to be manufactured for each angle of the knob rear inclined surface even within the same standard, and users are expected to experience the inconvenience and irrationality of purchasing and using dozens of tools. Furthermore, even when a dedicated tool is purchased and used for each angle of the knob rear inclined surface, the distance from the bolt flat portion right-angle end, the circular flange bottom surface, and the circular flange top surface to the knob rear inclined surface and the length of the knob lower connecting rod are not constant. Accordingly, the use of a tool that properly exhibits its own function may not be secured. In addition, only the angle of the knob rear inclined surface is different within the same standard, but products look the same in appearance. Accordingly, a worker may easily mix up the products by mistake. In addition, even when the tool is specially manufactured according to the pull stud bolt having different knob rear angles, it may be mixed and coupled with other species. When coupled and used in this way, there is also a problem in that the pull stud bolt may be damaged, the main spindle of the machine tool may be damaged, or hands may be injured during assembly.

According to U.S. Pat. No. 6,360,634, entitled "Pull stud removal device", the installation or removal of the pull stud bolt is performed by using an open tubular body having a shape similar to the axial end of the pull stud bolt. There is a problem in that a portion of the tubular body may be opened and the pull stud bolt may be released from the socket during the installation or removal of the pull stud bolt.

DISCLOSURE

Technical Problem

The present disclosure solves the problems of the related art and aims to provide a new type of pull stud bolt installation and removal tool, in which inclined surfaces are formed on an outer circumferential surface of a tubular body into which a pull stud bolt is inserted and an inner circumferential surface of a locking sleeve inserted along an outer diameter of the tubular body to restrain a locking ball, a locking ball retainer socket is formed to be inclined with respect to an axial direction, and an elastic body for maintaining a locking position is provided to continuously push the locking sleeve in a state in which there is no retracting operation of the locking sleeve by intentional gripping force, such that even when the contact position of the pull stud bolt in contact with the locking ball changes according to a manufacturing tolerance of the pull stud bolt or an angle of a knob rear inclined surface of the pull stud bolt, the locking ball comes into contact with the knob rear inclined surface of the pull stud bolt or the outer diameter of the knob lower connecting rod to transfer and maintain a continuous restraining force.

That is, the present disclosure aims to provide a new type of pull stud bolt installation and removal tool, in which even when the distance from the right-angle end in which the bolt flat portion of the pull stud bolt is formed, the circular flange bottom surface of the pull stud bolt, and the circular flange top surface to the knob rear inclined surface and the length between knob lower connecting rods are slightly different due to the manufacturing tolerance, the pull stud bolt may be perfectly restrained, and even when the standard angle of the knob rear inclined surface of the pull stud bolt knob is divided into 45°, 60°, 75°, and 90° within the same standard, one type of tool may be sufficiently used in common for products with different dimensions according to manufacturing tolerances and pull stud bolts with knob rear inclined surfaces of different angles, and the locking sleeve that restrains the locking ball using the elastic body for maintaining the locking position is continuously pushed, such that it does not retreat naturally unless it retreats with intentional grip, thereby securing the continuous restraint of the pull stud bolt and the safety when using the tool.

Technical Solution

In order to achieve the objectives described above, a pull stud bolt installation and removal tool according to an aspect of the present disclosure, which is coupled with a torque wrench, which is a tool for installing or removing a pull stud bolt onto or from a tool holder used in a machine tool, and which transfers rotational force of the torque wrench to the pull stud bolt when the pull stud bolt is inserted thereinto, may include: a tubular body including an inner cylinder into which a knob and a knob lower connecting rod of the pull stud bolt are inserted, and a plurality of locking ball retainer sockets disposed radially to pass through a side surface of the inner cylinder, the locking ball retainer socket being inclined downward toward an inside; a locking ball that is movably inserted into the locking ball retainer socket, moves toward an inside of the inner cylinder, comes into contact with the pull stud bolt to restrain the pull stud bolt from being released from the tubular body, and moves toward an outside of the inner cylinder to allow the pull stud bolt to be released from the tubular body; a locking sleeve that is coupled with an outside of the tubular body, is movable in a longitudinal direction of the tubular body, and when moving upward, comes into contact with the locking ball moving inside the tubular body, such that the locking ball maintains a locking position preventing the pull stud bolt from being released from the tubular body, and when moving downward, allows the locking ball to move in an outward direction of the tubular body; an elastic body that elastically presses the locking sleeve upward; and a support cover that is coupled with a lower end portion of the tubular body and supports another end portion of the elastic body so that one end of the elastic body presses the locking sleeve.

Preferably, the tubular body may include a first cylindrical portion, a second cylindrical portion spaced apart from the first cylindrical portion, and a connecting portion connecting the first cylindrical portion and the second cylindrical portion to each other.

Preferably, the locking ball retainer sockets may be radially spaced apart from each other in a circumferential direction.

In addition, preferably, the locking ball retainer socket may include an inner locking ball retainer socket portion arranged inside the inner cylinder, and an outer locking ball retainer socket portion connected to the inner locking ball retainer socket portion, and the locking ball is caught on the inner locking ball retainer socket portion and does not fall into the inner cylinder.

In addition, preferably, an inclined inner circumferential surface may be formed on an inner circumferential surface of the locking sleeve so as to be close to a center of the locking sleeve, and the inclined inner circumferential surface is formed at an angle that does not interfere with an outer circumferential surface of the tubular body.

On the other hand, according to another aspect of the present disclosure, provided is a method of manufacturing the tubular body provided in the pull stud bolt installation and removal tool, wherein an upper end portion of the tubular body on which the pull stud bolt is seated may be formed by electrical discharge machining (EDM) and forging.

Advantageous Effects

The present disclosure provides an effect of being able to be utilized as a common product by properly restraining various types of pull stud bolts. In addition, the present disclosure provides an effect of accurately and safely tightening a pull stud bolt to a desired place, such as a tool holder and a jig, by transferring, to the pull stud bolt, a constant torque defined by a torque wrench.

Figure 1:
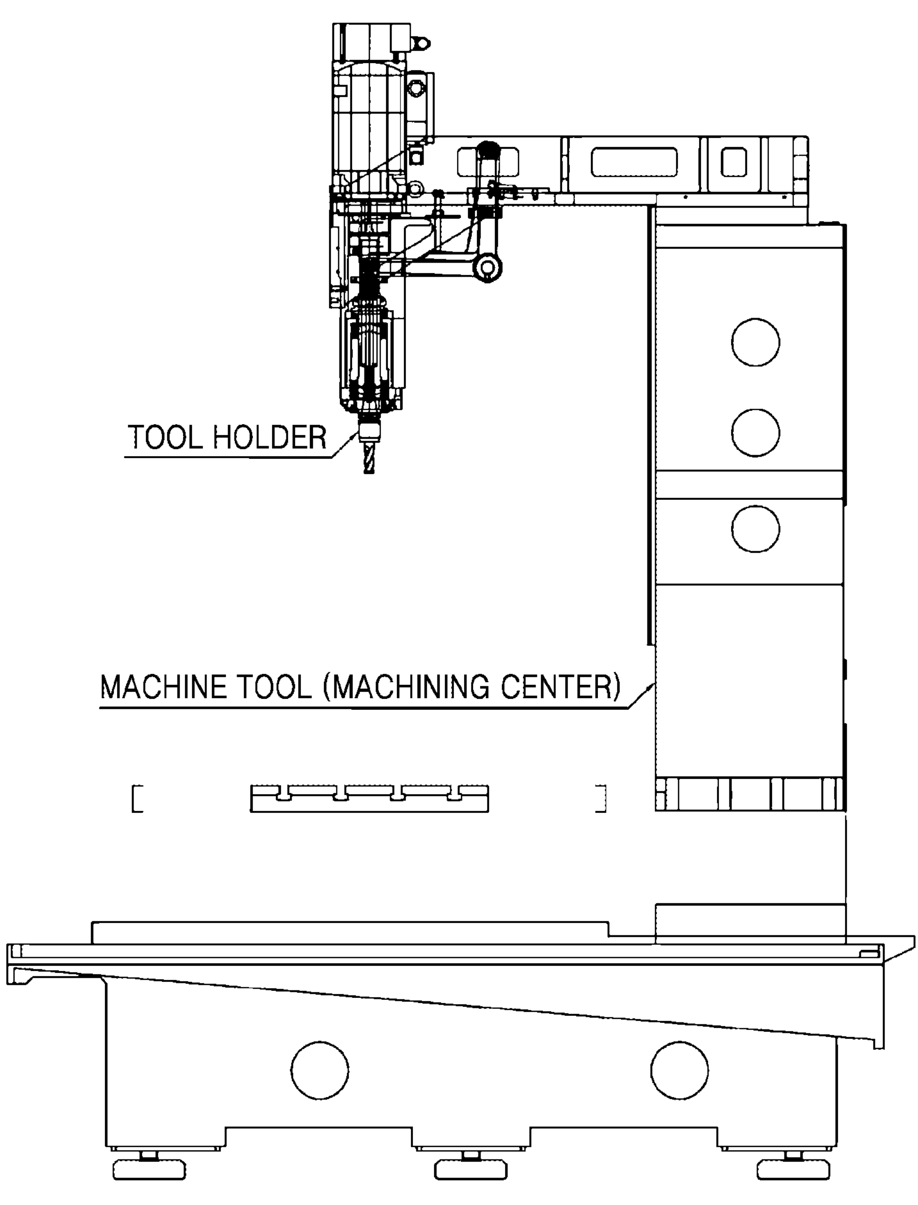
FIG. 1 is a diagram illustrating a machining center in which a cutting tool (end mill) is mounted.
Figure 2:
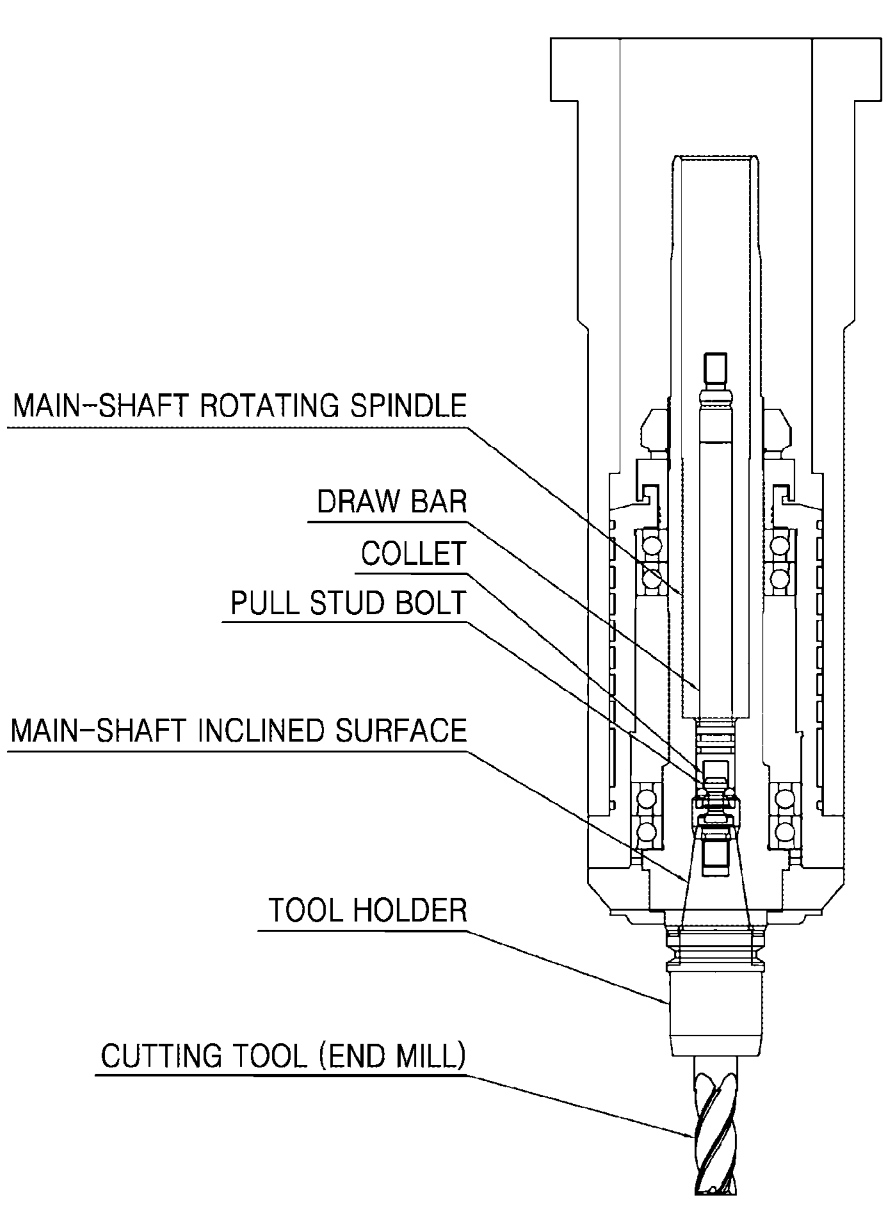
FIG. 2 is a diagram illustrating a configuration in which a main spindle of a machining center and a tool holder are coupled with each other via a pull stud bolt.
Figure 3:
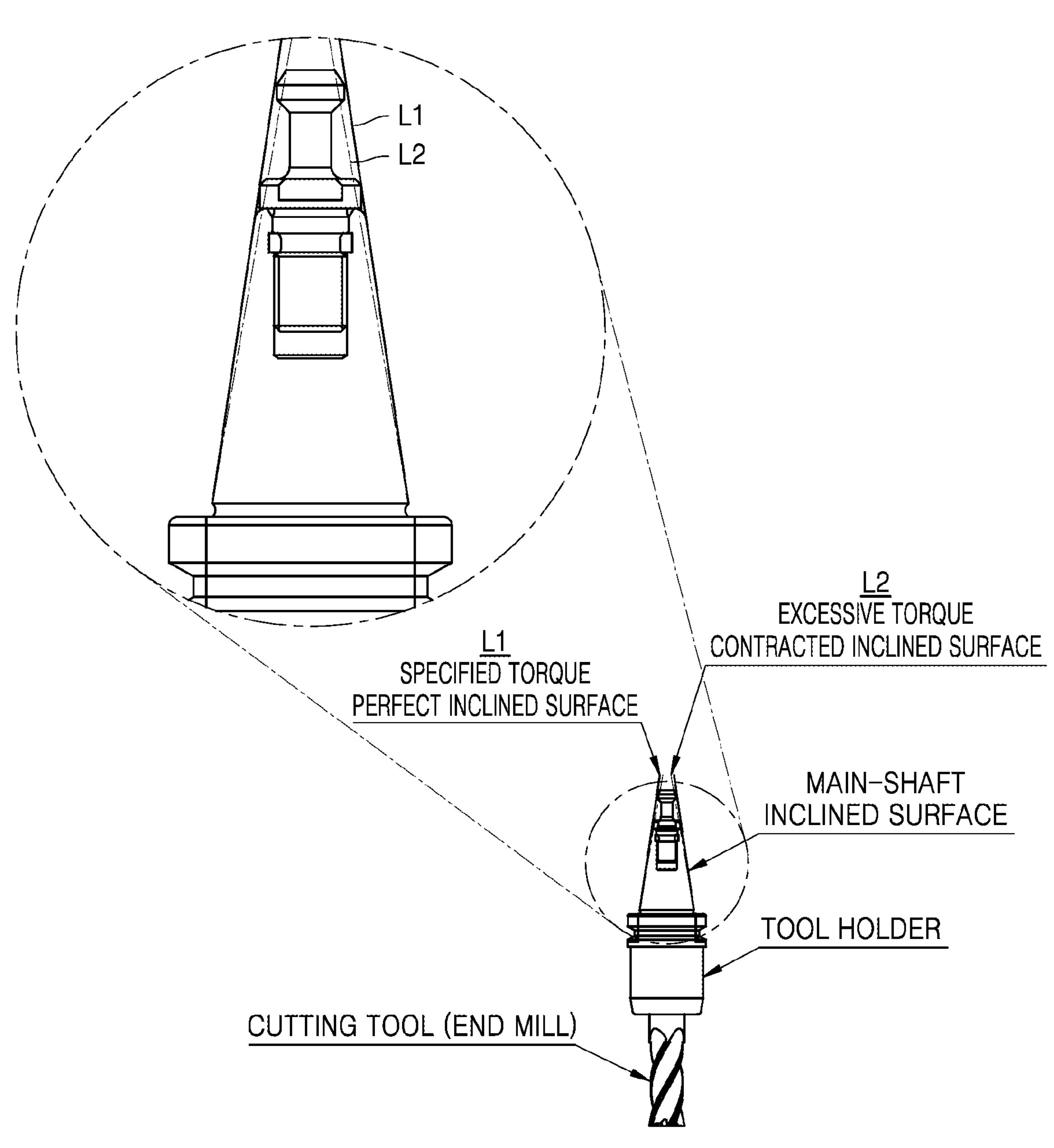
FIG. 3 is a diagram illustrating a outer diameter of shrinkage of an inclined surface of a tool holder according to tightening strength of a pull stud bolt.
Figure 4:
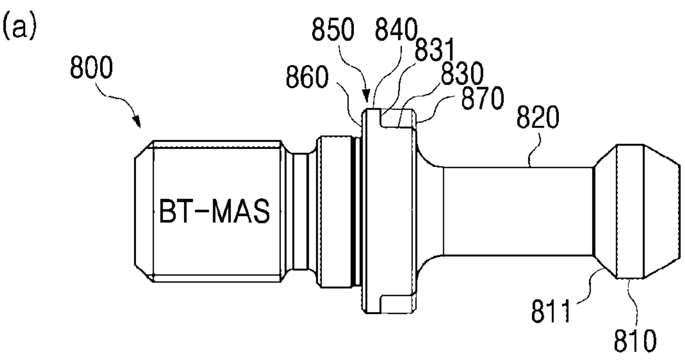
Figure 4:
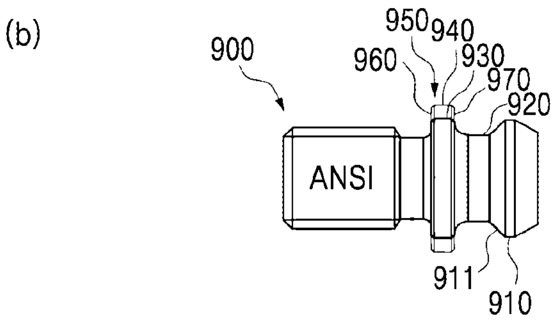
Figure 4:
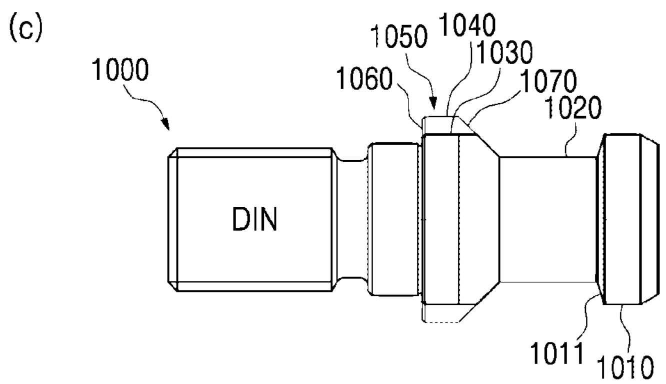
Figure 5:
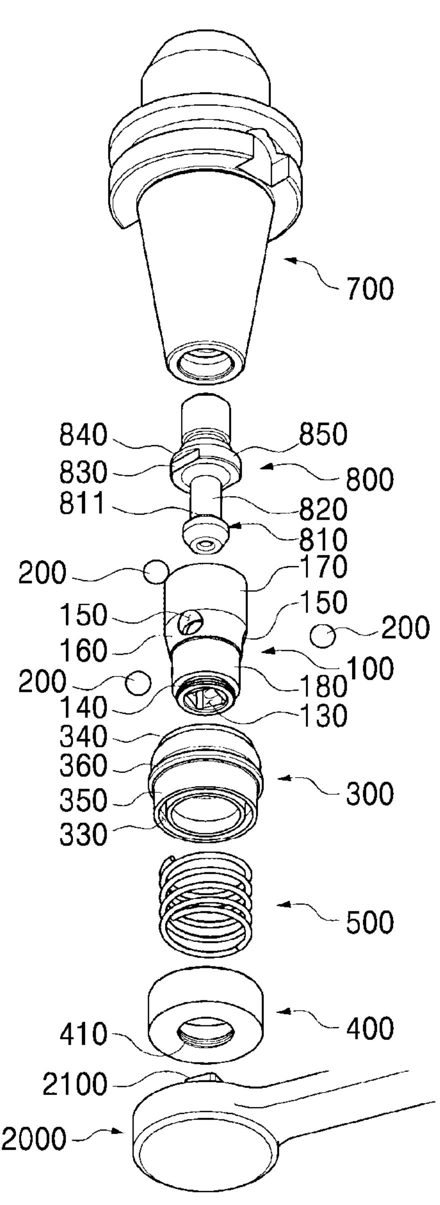
Figure 7:
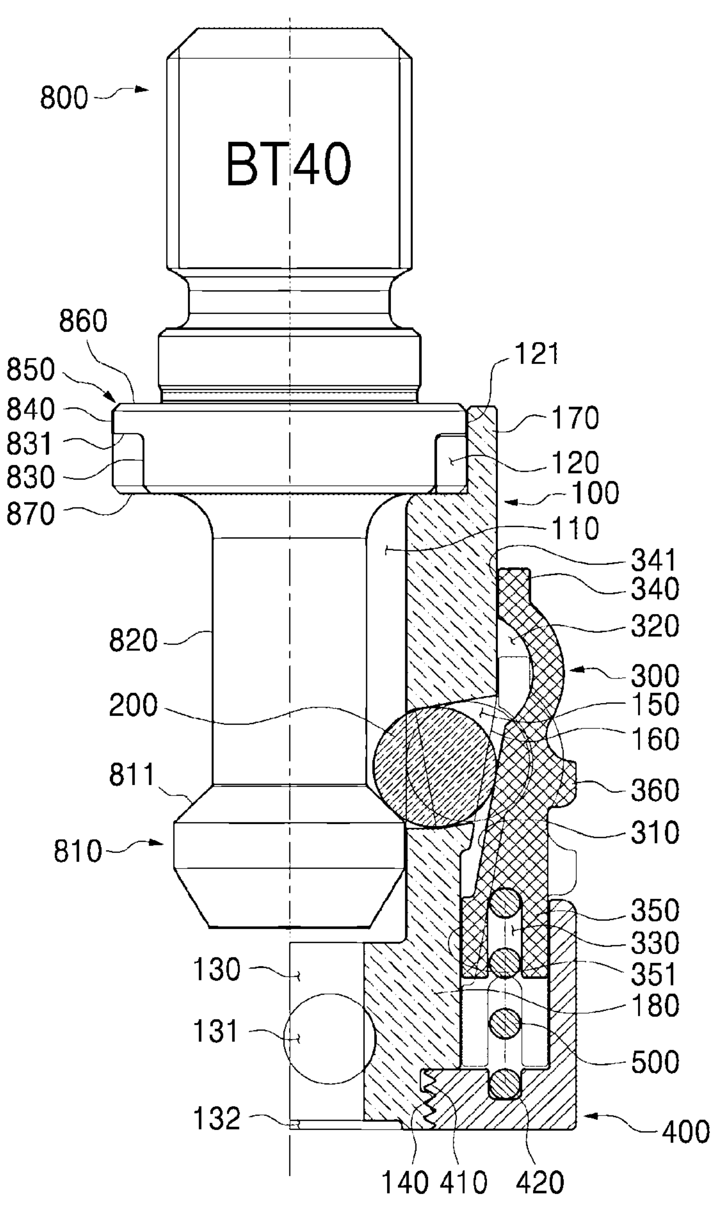
Figure 8:
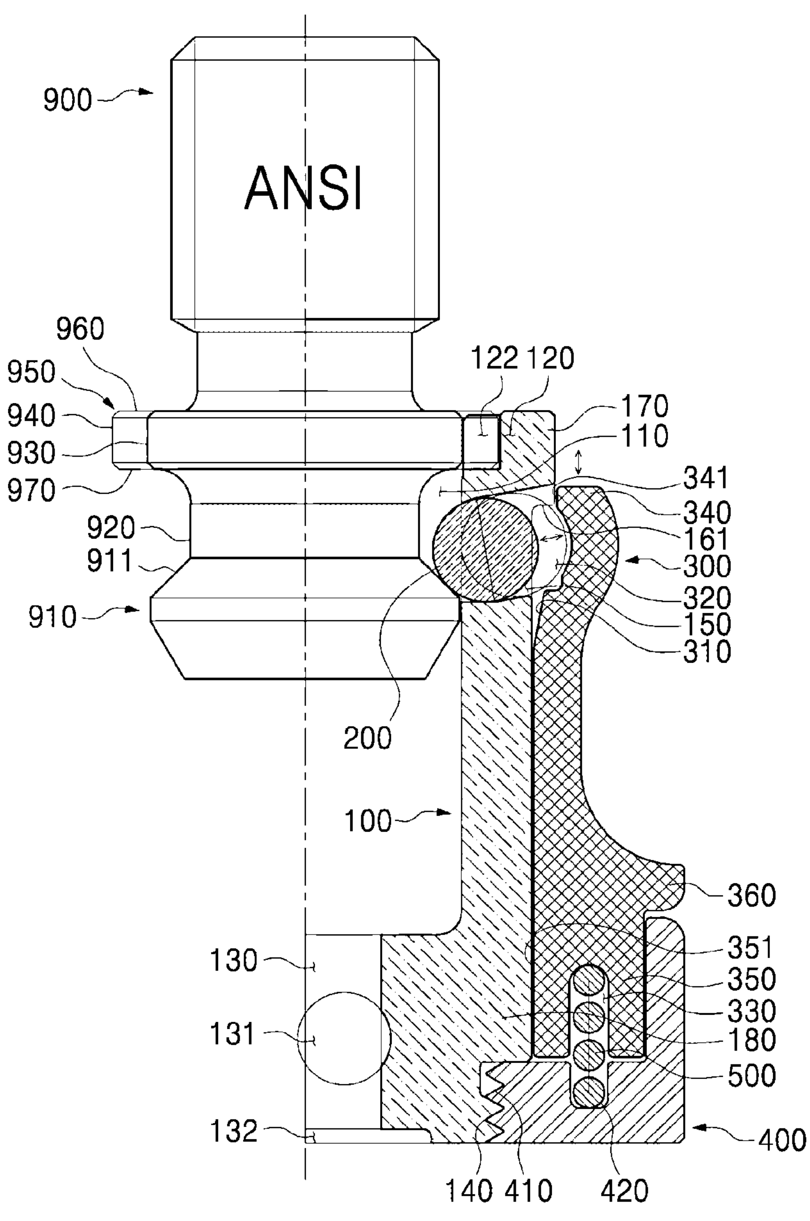
Figure 9:
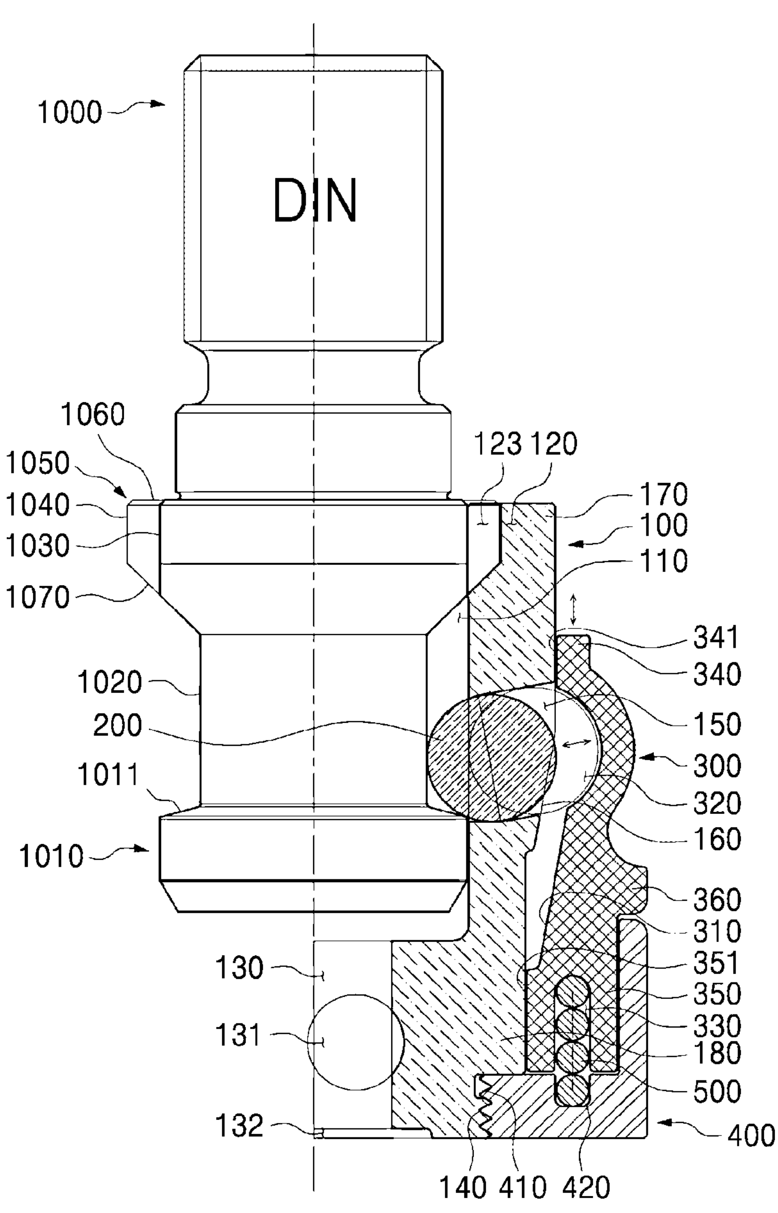
Figure 10:
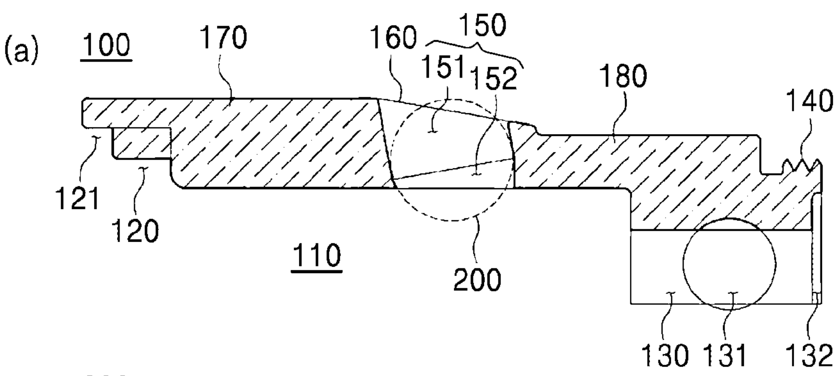
Figure 10:
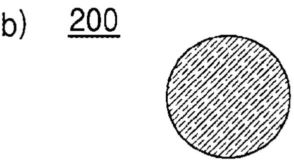
Figure 10:
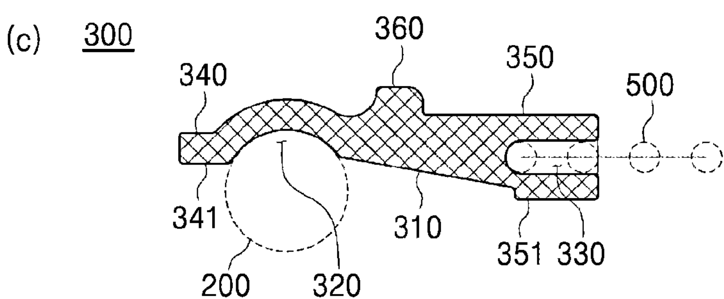
Figure 10:
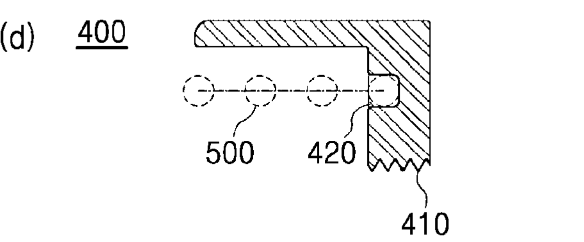
Figure 11:
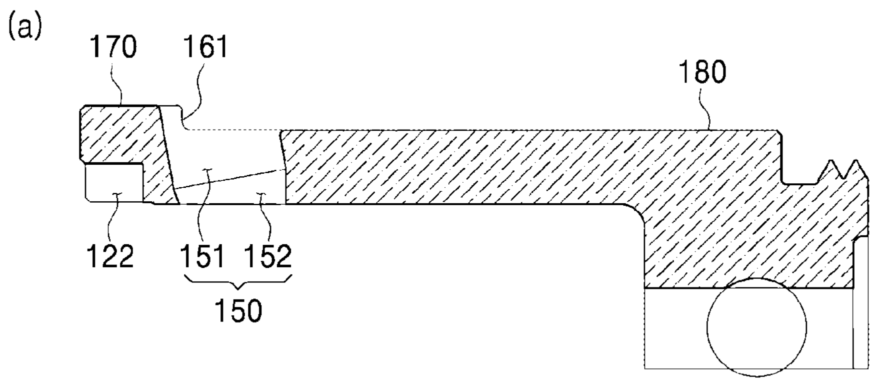
Figure 11:
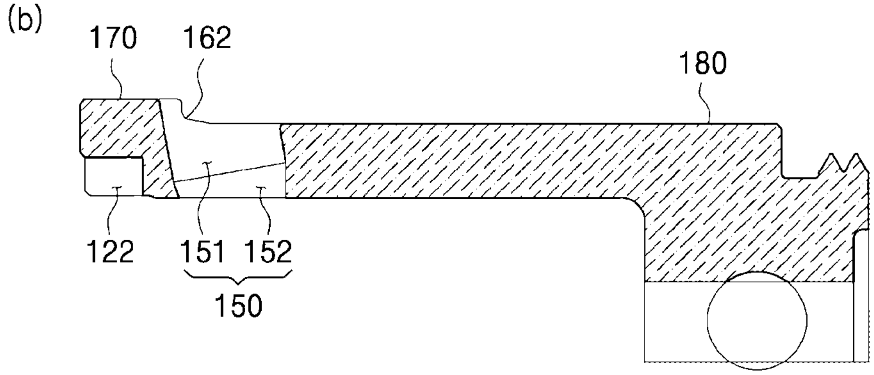
Figure 11:
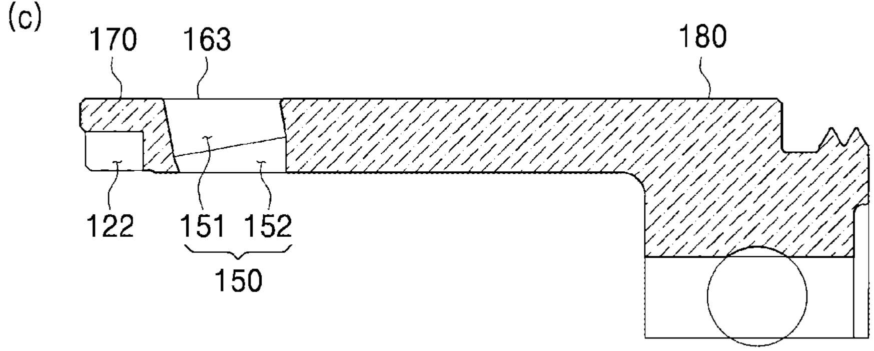
Figure 12:
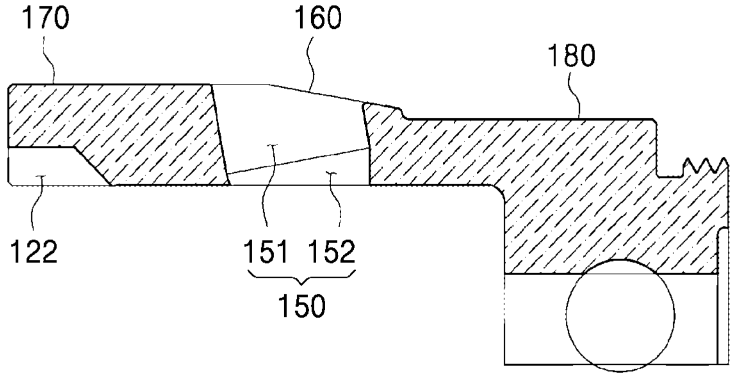
Figure 13:
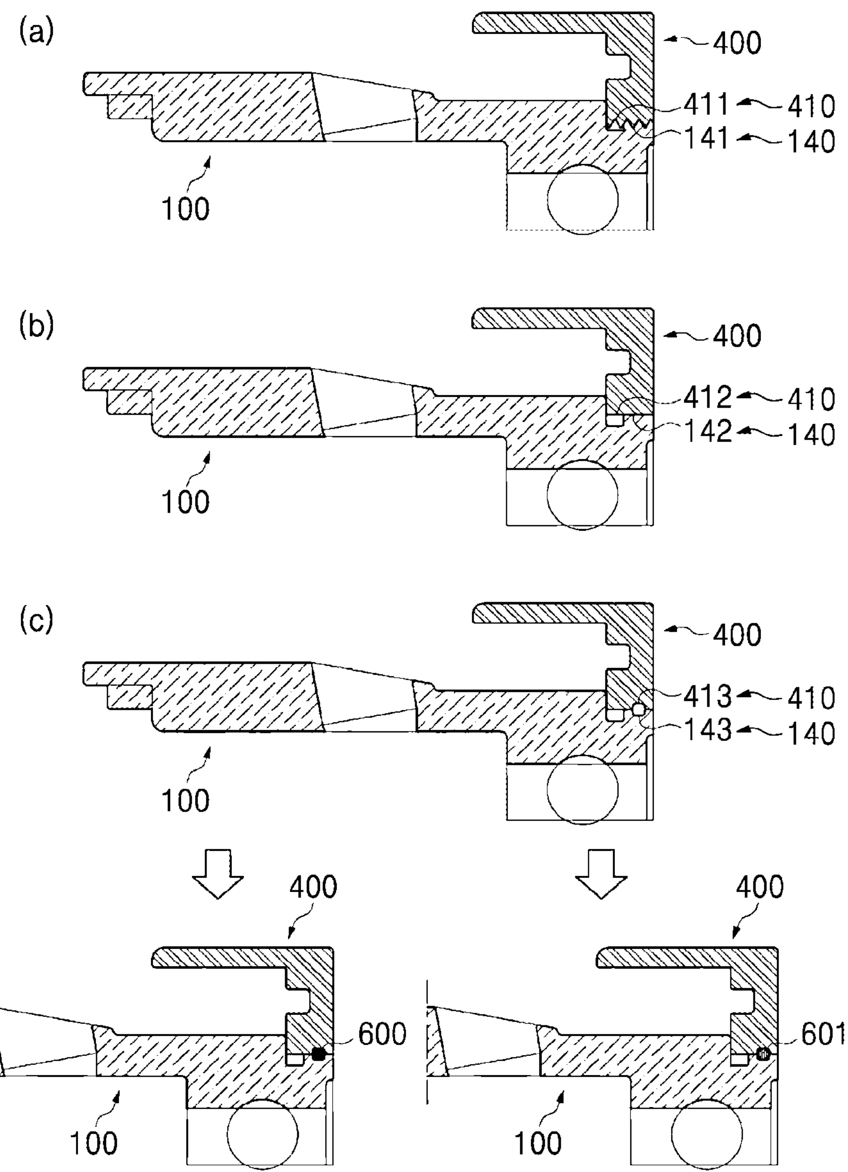
Figure 14:
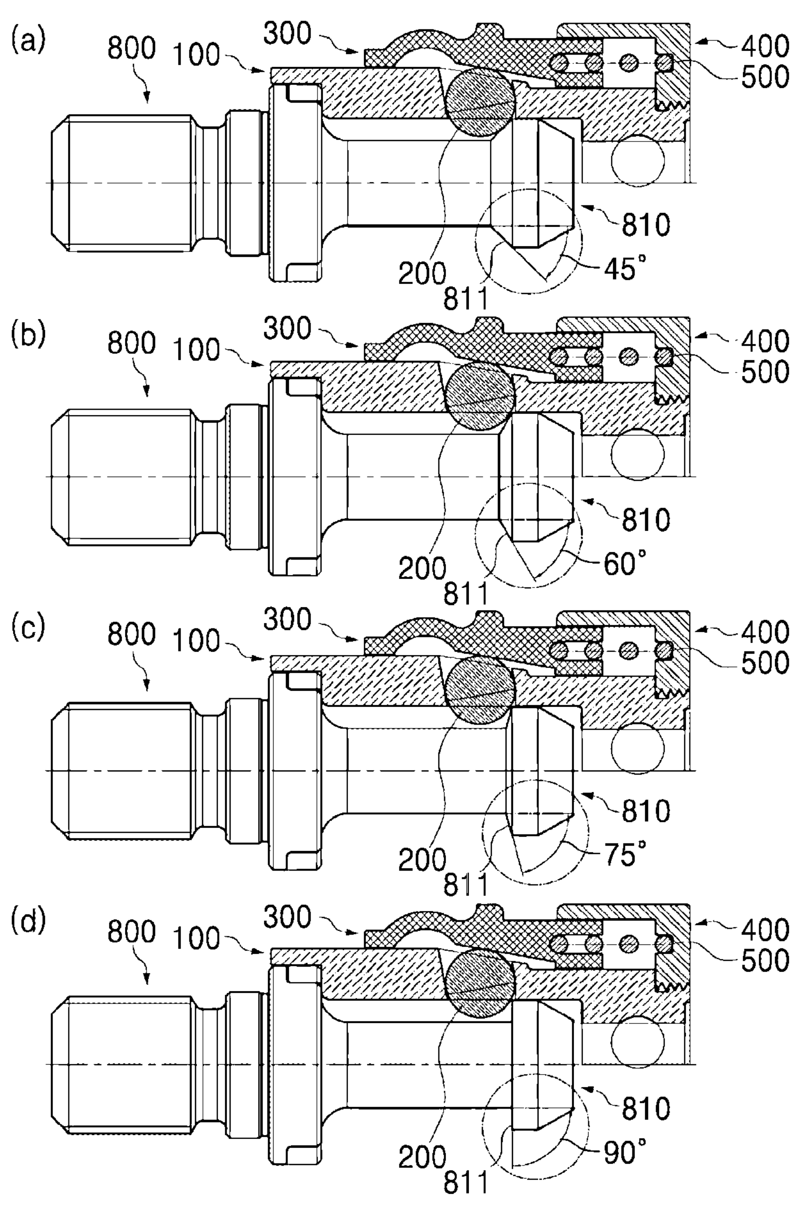
Figure 15:
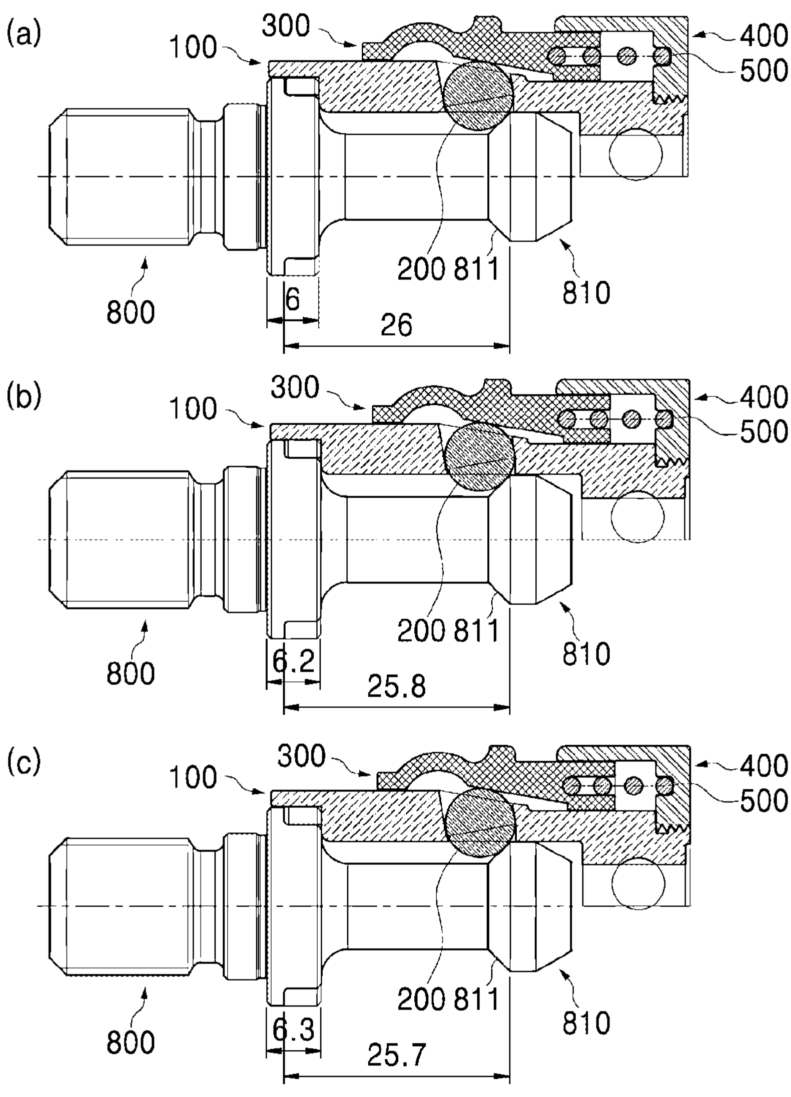
Figure 16:
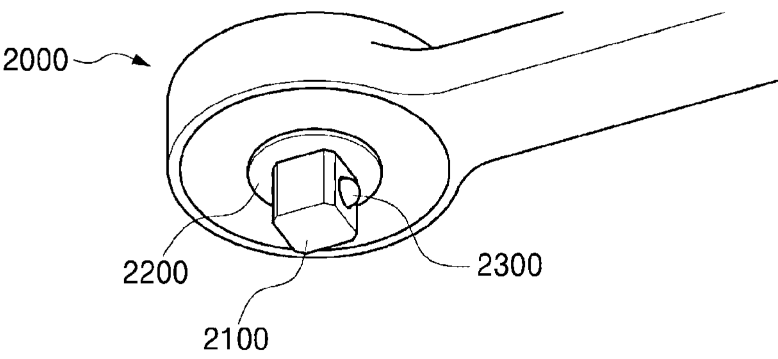

(a) to (c) of FIG. 4 are detailed cross-sectional views of pull stud bolts according to international standards, according to an embodiment of the present disclosure;

FIG. 5 is an exploded perspective view of a pull stud bolt installation and removal tool according to an embodiment of the present disclosure;

Figure 6:
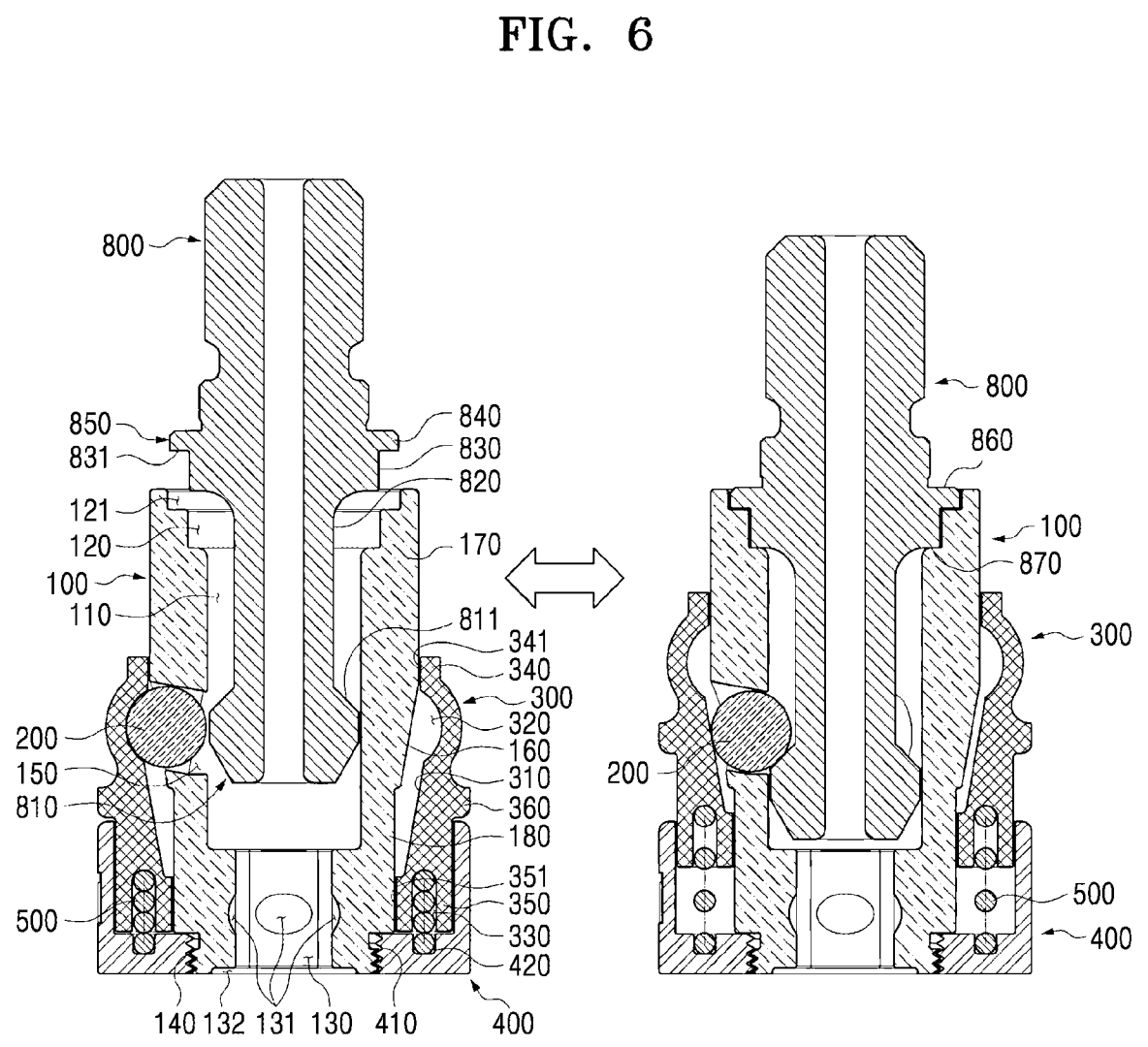

FIG. 6 is a cross-sectional view illustrating an operating state of a pull stud bolt installation and removal tool according to an embodiment of the present disclosure;

FIG. 7 is a cross-sectional view illustrating a state in which a pull stud bolt (BT-MAS standard) is restrained to a pull stud bolt installation and removal tool according to an embodiment of the present disclosure;

FIG. 8 is a cross-sectional view illustrating a state in which a pull stud bolt (ANSI standard) is restrained to a pull stud bolt installation and removal tool according to an embodiment of the present disclosure;

FIG. 9 is a cross-sectional view illustrating a state in which a pull stud bolt (DIN standard) is restrained to a pull stud bolt installation and removal tool according to an embodiment of the present disclosure;

(a) to (d) of FIG. 10 are cross-sectional views of main components of a pull stud bolt installation and removal tool according to an embodiment of the present disclosure;

(a) to (c) of FIG. 11 are diagrams illustrating an example of a shape structure of a tubular body having a heterogeneous flange insertion groove, according to an embodiment of the present disclosure;

FIG. 12 is a diagram illustrating an example of a shape structure of a tubular body having an inclined flange insertion groove, according to an embodiment of the present disclosure;

(a) to (c) of FIG. 13 are diagrams illustrating an example of a coupling structure between a tubular body and a support cover, according to an embodiment of the present disclosure;

(a) to (d) of FIG. 14 are diagrams illustrating a state in which different knob rear inclined surface angles of a pull stud bolt are restrained by one type of common product;

(a) to (c) of FIG. 15 are diagrams illustrating a contact position and a restrained state of a locking ball corresponding to different manufacturing tolerances for each product of a pull stud bolt; and FIG. 16 is a diagram illustrating a configuration of main components of a torque wrench.

MODE FOR INVENTION

Hereinafter, embodiments of the present disclosure will be described in detail with reference to the accompanying drawings. On the other hand, in the detailed description and drawings, illustrations and references to configurations and operations that may be easily understood by those of ordinary skill in the art are simplified or omitted. In particular, in the detailed description and the illustrations of drawings, detailed descriptions and illustrations of specific technical configurations and operations of elements not directly associated with the technical features of the present disclosure are omitted, and only the technical configurations associated with the present disclosure are briefly illustrated or described.

The present disclosure relates to a tool that is coupled with a tightening tool to transfer rotational force in order to install or remove pull stud bolts 800, 900, and 1000 onto or from a tool holder 700 used in a machine tool, and transfers rotational force of the tightening tool to the pull stud bolts 800, 900, and 1000 in a state in which the pull stud bolts 800, 900, and 1000 are inserted thereinto. Preferably, the tightening tool may be a torque wrench 2000. Of course, the tightening tool may include a general tool that generates rotational force, such as a wrench, a ratchet wrench, and an electric tool.

As illustrated in FIGS. 5 and 6, a pull stud bolt installation and removal tool according to an embodiment of the present disclosure includes a tubular body 100, a locking ball 200, a locking sleeve 300, an elastic body 500, and a support cover 400.

First, as illustrated in (a) of FIG. 4, the pull stud bolt tightened to the pull stud bolt installation and removal tool according to the present disclosure may be a BT-MAS standard (Japanese standard) that is widely used in Korea as one of the international standards.

As illustrated in FIG. 7, a tubular body 100 corresponding to the pull stud bolt 800 of (a) of FIG. 4 includes an inner cylinder 110 and a bolt flat portion insertion groove 120 formed at the upper end portion of the inner cylinder 110.

A knob 810 and a knob lower connecting rod 820 of the pull stud bolt 800 are inserted into the inner cylinder 110. The inner cylinder 110 is formed in a size that is not loose or tight so that the knob 810 and the knob lower connecting rod 820 of the pull stud bolt 800 are stably seated.

The bolt flat portion insertion groove 120 is a groove having a shape corresponding to a shape of a bolt flat portion 830. The bolt flat portion insertion groove 120 has an angular shape in which a portion thereof is flat. The bolt flat portion 830 of the pull stud bolt 800 is inserted into the bolt flat portion insertion groove 120. The bolt flat portion 830 is a portion formed to be flat at a portion of a side surface of a circular flange 850 provided at the upper portion of the knob lower connecting rod 820.

A flange curved portion insertion groove 121, which is formed to have a curved surface corresponding to a flange curved portion 840 located at the upper end of the bolt flat portion 830, is formed at the upper portion of the bolt flat portion insertion groove 120. The flange curved portion insertion groove 121 is a circular groove having a diameter corresponding to a diameter of the circular flange 850 of the pull stud bolt 800. The flange curved portion 840 constituting a portion of the circular flange 850 is inserted into the flange curved portion insertion groove 121.

First, as illustrated in (b) of FIG. 4, the pull stud bolt tightened to the pull stud bolt installation and removal tool according to the present disclosure may be an ANSI standard that is widely used in United States as one of the international standards.

As illustrated in FIG. 8, a tubular body 100 corresponding to the pull stud bolt 900 of (b) of FIG. 4 includes an inner cylinder 110 and a heterogeneous flange insertion groove 122 formed at the upper end portion of the inner cylinder 110.

A knob 910 and a knob lower connecting rod 920 of the pull stud bolt 900 are inserted into the inner cylinder 110. The inner cylinder 110 is formed in a size that is not loose or tight so that the knob 910 and the knob lower connecting rod 920 of the pull stud bolt 900 are stably seated.

The heterogeneous flange insertion groove 122 is a groove having a shape corresponding to a shape of a bolt flat portion 930. The heterogeneous flange insertion groove 122 has an angular heterogeneous shape in which a portion thereof is flat. A heterogeneous flange 940 of the pull stud bolt 900 is inserted into the heterogeneous flange insertion groove 122. The heterogeneous flange 940 is a portion formed to be flat at a portion of a side surface of a circular flange 950 provided at the upper portion of the knob lower connecting rod 920. The heterogeneous flange insertion groove 122 is a groove having a shape corresponding to a shape of the heterogeneous flange 940 of the pull stud bolt 900. The heterogeneous flange 940 is inserted into and seated in the heterogeneous flange insertion groove 122.

The pull stud bolt 900 does not form a perfect circular flange like the flange curved portion 840 of the pull stud bolt 800 of the BT-MAS standard (Japanese standard), but forms the heterogeneous flange 940 by machining a plane symmetrical to the side surface of the circular flange 950.

In addition, as illustrated in (c) of FIG. 4, the pull stud bolt tightened to the pull stud bolt installation and removal tool according to the present disclosure may be a DIN standard that is widely used in Germany as one of the international standards.

As illustrated in FIG. 9, a tubular body 100 corresponding to the pull stud bolt 1000 of (c) of FIG. 4 includes an inner cylinder 110 and an inclined flange insertion groove 123 formed at the upper end portion of the inner cylinder 110.

A knob 1010 and a knob lower connecting rod 1020 of the pull stud bolt 1000 are inserted into the inner cylinder 110. The inner cylinder 110 is formed in a size that is not loose or tight so that the knob 1010 and the knob lower connecting rod 1020 of the pull stud bolt 1000 are stably seated.

The inclined flange insertion groove 123 is a groove having a shape corresponding to a shape of a bolt flat portion 1030. The inclined flange insertion groove 123 is formed in a heterogeneous shape, a portion of which includes an inclined plane. An inclined flange 1040 of the pull stud bolt 1000 is inserted into the inclined flange insertion groove 123. The inclined flange 1040 is a flat and inclined portion formed at a portion of a side surface of a circular flange 1050 provided at the upper portion of the knob lower connecting rod 1020. The inclined flange insertion groove 123 is a groove having a shape corresponding to a shape of the inclined flange 1040 of the pull stud bolt 1000. The inclined flange 1040 is inserted into and seated in the inclined flange insertion groove 123.

The pull stud bolt 1000 does not form a perfect circular flange like the flange curved portion 840 of the pull stud bolt 800 of the BT-MAS standard (Japanese standard), but forms the inclined flange 1040 by machining a plane symmetrical to the side surface of the circular flange 1050.

As described above, the bolt flat portion insertion groove 120 and the flange curved portion insertion groove 121 are formed in double at the upper end of the tubular body 100 of FIG. 7 according to the embodiment, such that the bolt flat portion 830 and the flange curved portion 840 of the pull stud bolt 800 are completely fitted and inserted thereinto. In addition, the heterogeneous flange insertion groove 122 is formed at the upper end of the tubular body 100 of FIG. 8 according to the embodiment, such that the heterogeneous flange 940 of the pull stud bolt 900 is completely fitted and inserted thereinto. In addition, the inclined flange insertion groove 123 is formed at the upper end of the tubular body 100 of FIG. 9 according to the embodiment, such that the inclined flange 1040 of the pull stud bolt 1000 is completely fitted and inserted thereinto. Accordingly, rotational force of the torque wrench 2000 may be accurately and stably transferred to the pull stud bolts 800, 900, and 1000.

When the tubular body 100 is manufactured in accordance with the international standards and the bolt flat portion insertion groove 120 and the flange curved portion insertion groove 121, or the heterogeneous flange insertion groove 122 or the inclined flange insertion groove 123 are formed at the upper end of the tubular body 100, the bolt flat portion insertion groove 120, the flange curved portion insertion groove 121, the heterogeneous flange insertion groove 122, and the inclined flange insertion groove 123 may be formed by electrical discharge machining (EDM) and forging.

A wrench coupling portion 130 is formed at the lower end of the tubular body 100. The wrench coupling portion 130 may communicate with the inner cylinder 110, or may have one end portion blocked so as not to communicate with the inner cylinder 110. A head 2100 of the torque wrench 2000 is coupled with the wrench coupling portion 130.

A support cover coupling portion 140 is formed at the center of the lower end portion of the tubular body 100. A support cover 400 is coupled with the support cover coupling portion 140. The head 2100 of the torque wrench 2000 may be formed in a shape of a protruding portion having a polygonal cross-sectional shape, or may be formed in a shape of a groove portion having a polygonal cross-sectional shape. In response to this, a shape of the wrench coupling portion 130 is also determined by one of the shapes of the groove portion and the protruding portion. When the head 2100 of the torque wrench 2000 is formed in the shape of the protruding portion having a polygonal cross-sectional shape, the wrench coupling portion 130 of the tubular body 100 may be formed in the shape of a groove portion.

As illustrated in FIGS. 7, 8, and 9, a wrench interference prevention groove 132 surrounding the lower portion of the wrench coupling portion 130 is formed below the tubular body 100. The wrench interference prevention groove 132 is formed to have a diameter greater than a diameter of the wrench coupling portion 130. A separation prevention ball locking groove 131 is recessed at the center of the inner circumferential surface of the wrench coupling portion 130 in the vertical direction. As illustrated in FIG. 16, a head flange 2200 protruding minutely from the bottom surface of the torque wrench 2000 is located in the wrench interference prevention groove 132, and a separation prevention ball

2300 protruding from the side surface of the head 2100 of the torque wrench 2000 is located in a separation prevention ball locking groove 131. Accordingly, the torque wrench 2000 inserted into the wrench coupling portion 130 of the tubular body 100 may maintain tight coupling with the tubular body 100 without interference.

The tubular body 100 includes a plurality of locking ball retainer sockets 150 arranged radially in the circumferential direction. The locking ball retainer socket 150 is formed to pass through the side surface of the tubular body 100. That is, the locking ball retainer socket 150 communicates with the inner cylinder 110 of the tubular body 100. According to the present embodiment, the locking ball retainer socket 150 is formed to be inclined with respect to the axial direction. That is, the locking ball retainer socket 150 is formed to be inclined toward the inside. According to the present embodiment, a plurality of locking ball retainer sockets 150 and a plurality of locking balls 200 are radially arranged at uniformly spaced angles such that the fixing force acts uniformly when the pull stud bolts 800, 900, and 1000 are locked.

On the other hand, as illustrated in (a) of FIG. 10, the locking ball retainer socket 150 has a two-stage structure including an outer locking ball retainer socket portion 151 disposed outside in the circumferential direction and an inner locking ball retainer socket portion 152 disposed inside in the circumferential direction. The outer locking ball retainer socket portion 151 is formed as a cylinder having a diameter slightly greater than a diameter of the locking ball 200, and the inner locking ball retainer socket portion 152 has an inclined structure in which the diameter thereof decreases toward the inside in the circumferential direction. The inner locking ball retainer socket portion 152 prevents the locking ball 200 from falling into the inner cylinder 110 of the tubular body 100.

In response to the pull stud bolts 800, 900, and 1000 of the international standards, i.e., the BT-MAS standard (Japanese standard), the ANSI standard, and the DIN standard, the tubular body 100 may have a shape structure including the bolt flat portion insertion groove 120 and the flange curved portion insertion groove 121, as illustrated in (a) of FIG. 10, may have a shape structure including the heterogeneous flange insertion groove 122, as illustrated in (a) to (c) of FIG. 11, or may have a shape structure including the inclined flange insertion groove 123, as illustrated in FIG. 12.

The tubular body 100 may include a first cylindrical portion 170 having the inner cylinder 110 formed therein, a second cylindrical portion 180 having the wrench coupling portion 130 formed therein, and a connecting portion connecting the first cylindrical portion 170 to the second cylindrical portion 180. The diameter of the second cylindrical portion 180 may be less than or equal to the diameter of the first cylindrical portion 170. The outer circumferential surface of the connecting portion may have a shape of an inclined outer circumferential surface 160, as illustrated in (a) of FIG. 10 and FIG. 12. Alternatively, it may be provided as a connection portion 161 formed in a stepped shape, as illustrated in (a) of FIG. 11, or may be formed as an inclined connection portion 162 formed in an inclined stepped shape, as illustrated in (b) of FIG. 11. The locking ball retainer socket 150 may be formed on the inclined outer circumferential surface 160, the connection portion 161, or the inclined connection portion 162 of the connecting portion. Of course, the locking ball retainer socket 150 may be disposed in the first cylindrical portion 170 or the second cylindrical portion 180, may be disposed across the first cylindrical portion 170 and the connecting portion, or may be disposed across the second cylindrical portion 180 and the connecting portion.

In addition, in a tool of a specific standard, the tubular body 100 includes the first cylindrical portion 170 and the second cylindrical portion 180, and the first cylindrical portion 170 and the second cylindrical portion 180 may have the same diameter. In addition, the tubular body 100 according to another embodiment may be formed by including the first cylindrical portion 170 and the second cylindrical portion 180 having the same diameter and by including the connection portion 161 or the inclined connection portion 162 connecting the first cylindrical portion 170 to the second cylindrical portion 180. The connection portion 161 or the inclined connection portion 162 is formed so as not to collide with the inclined inner circumferential surface 310 of the locking sleeve 300.

In addition, in a tool of a specific standard, the tubular body 100 may include the first cylindrical portion 170 having the inner cylinder 110 formed therein, the second cylindrical portion 180 having the wrench coupling portion 130 formed therein, and the connection portion 161 or the inclined connection portion 162 connecting the first cylindrical portion 170 to the second cylindrical portion 180. The second cylindrical portion 180 may have a diameter less than or equal to a diameter of the first cylindrical portion 170. When the second cylindrical portion 180 is less than the first cylindrical portion 170, the connection portion 161 may be formed in the form of a step, a cross-section of which is a right angle. The inclined connection portion 162 may be formed in the form of a step, a portion of a cross-section of which is inclined. Alternatively, as illustrated in (c) of FIG. 11, the first and second cylindrical portions 170 and 180 may be formed by being connected to each other by a parallel connecting cylinder 163. The locking ball retainer socket 150 may be disposed at a certain angle with the connection portion 161 or the inclined connection portion 162. Of course, the locking ball retainer socket 150 may be disposed in the first cylindrical portion 170 or the second cylindrical portion 180, may be disposed across a portion connected to the first cylindrical portion 170, or may be disposed across a portion connected to the second cylindrical portion 180.

As illustrated in FIGS. 6 and 7, the locking ball 200 is movably disposed in the locking ball retainer socket 150 of the tubular body 100. The locking ball 200 moves toward the inside in the circumferential direction, which is the locking position, and comes into contact with the knob rear inclined surfaces 811, 911, and 1011 or the knob lower connecting rods 820, 920, and 1020 of the pull stud bolts 800, 900, and 1000, such that the pull stud bolts 800, 900, and 1000 are restrained from being separated. The locking ball 200 moves toward the outside in the circumferential direction, which is the release position, and releases the pull stud bolts 800, 900, and 1000 such that the pull stud bolts 800, 900, and 1000 are freely separated. That is, the locking ball 200 moves toward the inside of the tubular body 100 and comes into contact with the pull stud bolts 800, 900, and 1000, such that the pull stud bolts 800, 900, and 1000 are restrained from being separated from the tubular body 100. The locking ball 200 moves toward the outside of the tubular body 100 and allows the pull stud bolts 800, 900, and 1000 to be separated from the tubular body 100.

The locking sleeve 300 is formed as a hollow cylinder, is coupled with the outside of the tubular body 100, and is movably coupled in the longitudinal direction of the tubular body 100. When the locking sleeve 300 moves, the tubular body 100 serves as a guide. When the locking sleeve 300 moves upward, the locking sleeve 300 comes into contact with the locking ball 200 moving inside the tubular body 100. The locking ball 200 maintains the locking position to prevent the pull stud bolts 800, 900, and 1000 from being separated from the tubular body 100. When the locking sleeve 300 moves downward, the locking ball 200 is allowed to move toward the outside of the tubular body 100.

As illustrated in (c) of FIG. 10, the locking sleeve 300 may include an upper cylinder 340 and a lower cylinder 350. An upper cylinder inner circumferential surface 341 and a lower cylinder inner circumferential surface 351 may be connected to each other by an inclined inner circumferential surface 310 inclined at a certain set angle. The inclined inner circumferential surface 310 may be formed between the upper cylinder inner circumferential surface 341 and the lower cylinder inner circumferential surface 351. In another embodiment, the upper cylinder inner circumferential surface 341 and the inclined inner circumferential surface 310 may be connected to each other and formed to be inclined, or the lower cylinder inner circumferential surface 351 and the inclined inner circumferential surface 310 may be connected to each other and formed to be inclined.

On the other hand, a stepped surface may be formed between the inclined outer circumferential surface 160 and the outer circumferential surface of the second cylindrical portion 180 of the tubular body 100 and between the lower cylinder inner circumferential surface 351 and the inclined inner circumferential surface 310 of the locking sleeve 300. The stepped surface widens the contact area between the tubular body 100 and the locking sleeve 300 and serves as a stopper to stop the locking sleeve 300 moving along the tubular body 100.

When the locking sleeve 300 moves upward, the inclined inner circumferential surface 310 comes into contact with the locking ball 200 and restrains the locking ball 200 inward in the circumferential direction. When the locking sleeve 300 moves downward, the inner space is expanded by the inclined inner circumferential surface 310, allowing the locking ball 200 to move outward in the circumferential direction. The locking sleeve 300 forms a locking ball release pocket 320 concavely at the upper portion of the inclined inner circumferential surface 310. Accordingly, when the locking ball 200 moves outward in the circumferential direction, the pull stud bolts 800, 900, and 1000 may be freely released while being located in the locking ball release pocket 320.

An elastic body seating groove 330 is formed on the bottom surface of the locking sleeve 300, and one end of the elastic body 500 for maintaining the locking position is inserted and seated at a certain depth. In this manner, the elastic body seating groove 330 supports and protects the elastic body 500 that contracts and expands. In addition, the elastic body 500 may be maintained in place while preventing the shape deformation of the elastic body 500 even in frequent contraction and expansion operations of the elastic body 500. Of course, the locking sleeve 300 may support the elastic body 500 in a state in which one end of the elastic body 500 is in contact with the bottom surface of the locking sleeve 300, without forming the elastic body seating groove 330. In addition, a protrusion 360 is formed on the outer circumferential surface of the locking sleeve 300 so as to prevent slipping during a worker's retreating action with respect to the locking sleeve 300. In addition, in another embodiment, the outer circumferential surface of the locking sleeve 300 may be formed as a parallel outer circumferential surface without the protrusion 360, and a roughened surface, a knurled surface, a grooved surface, and the like may be additionally formed on the outer circumferential surface.

The support cover 400 is coupled with the support cover coupling portion 140 formed at the lower portion of the tubular body 100. A tubular body coupling portion 410 is formed at the central portion of the support cover 400 and is coupled with the support cover coupling portion 140 of the tubular body 100 without interference with the wrench coupling portion 130.

In addition, as illustrated in (d) of FIG. 10, an elastic body seating groove 420 is formed at the edge of the bottom surface of the support cover 400, and the other end of the elastic body 500 is inserted and seated at a certain depth. In this manner, the elastic body 500 may be maintained in place while preventing the shape deformation of the elastic body 500 even in frequent contraction and expansion operations of the elastic body 500. Of course, the support cover 400 may support the elastic body 500 in a state in which the other end of the elastic body 500 is in contact with the bottom surface of the support cover 400 without forming the elastic body seating groove 420. In addition, a roughened surface, a knurled surface, a grooved surface, and the like are additionally formed on the outer circumferential surface of the support cover 400 so as to prevent slipping when a worker holds the support cover 400 to couple the support cover 400 to the tubular body 100.

On the other hand, the support cover 400 and the tubular body 100 may be combined to each other in various ways, as illustrated in (a) to (c) of FIG. 13. That is, as illustrated in (a) of FIG. 13, a coupling method in which the tubular body coupling portion 410 of the support cover 400 and the support cover coupling portion 140 of the tubular body 100 are provided with a female threaded portion 411 and a male threaded portion 141 and perfectly coupled with each other in a bolt-nut coupling structure may be adopted. In addition, as illustrated in (b) of FIG. 13, a coupling method in which the tubular body coupling portion 410 of the support cover 400 and the support cover coupling portion 140 of the tubular body 100 are provided with a cylinder inner circumferential press-fitting portions 412 and a cylinder outer circumferential press-fitting portion 142, are press-fitted to each other, and are coupled with each other by frictional force may be adopted. As illustrated in (c) of FIG. 13, a coupling method in which the tubular body coupling portion 410 of the support cover 400 and the support cover coupling portion 140 of the tubular body 100 form a groove portion 143 and an adhesive material 600 such as Loctite is injected into the groove portion 413 or a ring 601 capable of preventing separation is inserted and coupled may be adopted.

The elastic body 500 is located between the bottom surface of the support cover 400 and the bottom surface of the locking sleeve 300, and elastic bodies of various shapes and materials may be used. The elastic body 500 continuously presses the locking sleeve 300 in a state in which there is no retreating operation of the locking sleeve 300 by intentional gripping force. Accordingly, the locking ball 200 in contact with the inclined inner circumferential surface 310 of the locking sleeve 300 receives continuous restraining force inward in the circumferential direction. Specifically, even when the contact positions of the pull stud bolts 800, 900, and 1000 in contact with the locking ball 200 are changed because the angles (standard angles of 45°, 60°, 75°, and 90°) of the knob rear inclined surfaces 811, 911, and 1011 of the pull stud bolts 800, 900, and 1000 are different as illustrated in (a) to (d) of FIG. 14, or the thickness of the circular flanges 850, 950, and 1050, the distance to the knob rear inclined surfaces 811, 911, and 1011, and the lengths of the knob lower connecting rods 820, 920, and 1020 are different depending on the manufacturing tolerances of the pull stud bolts 800, 900, and 1000, as illustrated in (a) to (c) of FIG. 15, the locking ball 200 comes into contact with the knob rear inclined surfaces 811, 911, and 1011 or the outer diameters of the knob lower connecting rods 820, 920, and 1020 of the pull stud bolts 800, 900, and 1000 to transfer and maintain continuous restraining force, as illustrated in (a) to (d) of FIG. 14 and (a) to (c) of FIG. 15.

Although the pull stud bolt installation and removal tool according to the embodiment of the present disclosure has been described above and illustrated in the drawings, this is only an example, and it will be understood by those of ordinary skilled in the art that various changes are possible within the scope of the present disclosure without departing from the technical spirit of the present disclosure.

DESCRIPTION OF SYMBOLS

100: tubular body
110: inner cylinder
120: bolt flat portion insertion groove
121: heterogeneous curved portion insertion groove
122: heterogeneous flange insertion groove
123: inclined flange insertion groove
130: wrench coupling portion
131: release prevention ball locking groove
132: wrench interference prevention groove
140: support cover coupling portion
141: male threaded portion
142: cylinder outer circumferential press-fitting portion
143: groove portion
150: locking ball retainer socket
151: outer locking ball retainer socket portion
152: inner locking ball retainer socket portion
160: inclined outer circumferential surface
161: connection portion
162: inclined connection portion
163: parallel connecting cylinder
170: first cylindrical portion
180: second cylindrical portion
200: locking ball
300: locking sleeve
310: inclined inner circumferential surface
320: locking ball release pocket
330: elastic body seating groove
340: upper cylinder
341: upper cylinder inner circumferential surface
350: lower cylinder
351: lower cylinder inner circumferential surface
360: protrusion
400: support cover
410: tubular body coupling portion
411: female threaded portion
412: cylinder inner circumferential press-fitting portion
413: groove portion
420: elastic body seating groove
500: elastic body
600: adhesive material
601: ring
700: tool holder
800: pull stud bolt (BT-MAS)
810: knob
811: knob rear inclined portion
820: knob lower connecting rod
830: bolt flat portion
831: bolt flat portion right angle end
840: flange curved portion
850: circular flange
860: circular flange bottom surface
870: circular flange top surface
900: pull stud bolt (ANSI)
910: knob
911: knob rear inclined portion
920: knob lower connecting rod
930: bolt flat portion
940: heterogeneous flange
950: circular flange
960: circular flange bottom surface
970: circular flange top surface
1000: pull stud bolt (DIN)
1010: knob
1011: knob rear inclined portion
1020: knob lower connecting rod
1030: bolt flat portion
1040: inclined flange
1050: circular flange
1060: circular flange bottom surface
1070: circular flange inclined top surface
2000: torque wrench
2100: head
2200: head flange
2300: release prevention ball

The invention claimed is:

1. A pull stud bolt installation and removal tool, which is coupled with a torque wrench which is a tool for installing or removing a pull stud bolt onto or from a tool holder used in a machine tool, and which transfers rotational force of the torque wrench to the pull stud bolt when the pull stud bolt is inserted thereinto, the pull stud bolt installation and removal tool comprising:

a tubular body comprising an inner cylinder into which a knob and a knob lower connecting rod of the pull stud bolt are inserted, and a plurality of locking ball retainer sockets disposed radially to pass through a side surface of the inner cylinder, the locking ball retainer socket being inclined downward toward an inside;

a locking ball that is movably inserted into the locking ball retainer socket, moves toward an inside of the inner cylinder, comes into contact with the pull stud bolt to restrain the pull stud bolt from being released from the tubular body, and moves toward an outside of the inner cylinder to allow the pull stud bolt to be released from the tubular body;

a locking sleeve that is coupled with an outside of the tubular body, is movable in a longitudinal direction of the tubular body, and when moving upward, comes into contact with the locking ball moving inside the tubular body, such that the locking ball maintains a locking position preventing the pull stud bolt from being released from the tubular body, and when moving downward, allows the locking ball to move in an outward direction of the tubular body;

an elastic body that elastically presses the locking sleeve upward; and a support cover that is coupled with a lower end portion of the tubular body and supports another end portion of the elastic body so that one end of the elastic body presses the locking sleeve.

2. The pull stud bolt installation and removal tool of claim 1, wherein the tubular body comprises a first cylindrical portion, a second cylindrical portion spaced apart from the first cylindrical portion, and a connecting portion connecting the first cylindrical portion and the second cylindrical portion to each other.

3. The pull stud bolt installation and removal tool of claim 1, wherein the locking ball retainer sockets are radially spaced apart from each other in a circumferential direction.

4. The pull stud bolt installation and removal tool of claim 1, wherein the locking ball retainer socket comprises an inner locking ball retainer socket portion arranged inside the inner cylinder, and an outer locking ball retainer socket portion connected to the inner locking ball retainer socket portion, and the locking ball is caught on the inner locking ball retainer socket portion and does not fall into the inner cylinder.

5. The pull stud bolt installation and removal tool of claim 1, wherein an inclined inner circumferential surface is formed on an inner circumferential surface of the locking sleeve so as to be close to a center of the locking sleeve, and the inclined inner circumferential surface is formed at an angle that does not interfere with an outer circumferential surface of the tubular body.

6. The pull stud bolt installation and removal tool of claim 1, wherein a locking ball release pocket in which the locking ball is accommodated is formed on an upper portion of the locking sleeve, and when the locking ball moves to the outside of the tubular body and is located in the locking ball release pocket, the pull stud bolt is allowed to be released from the tubular body.

7. A method of manufacturing the tubular body provided in the pull stud bolt installation and removal tool of claim 1, wherein an upper end portion of the tubular body on which the pull stud bolt is seated is formed by electrical discharge machining (EDM) and forging.

* * * * *